C. R. BOYER.
VEHICLE WHEEL.
APPLICATION FILED APR. 30, 1918.
1,362,922.
Patented Dec. 21, 1920.
Fig. 1
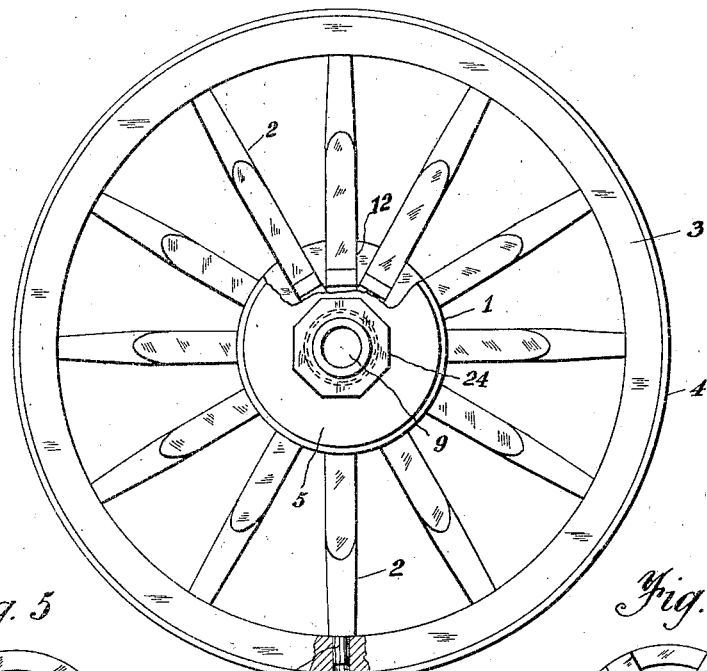
Fig. 5
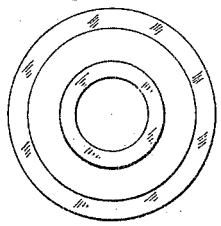
Fig. 3
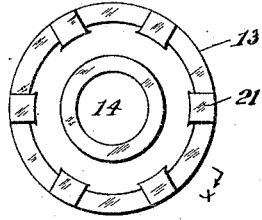
Fig. 2
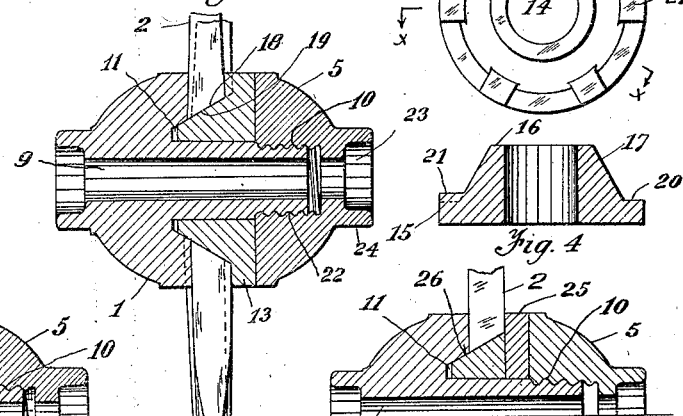
Fig. 6
Fig. 4
Fig. 7
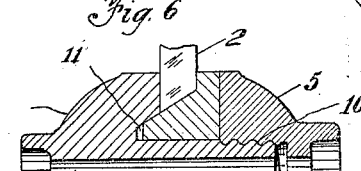
Fig. 8
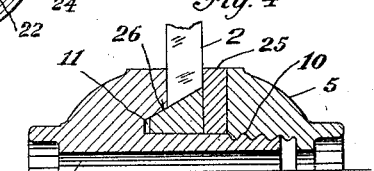
INVENTOR
CHARLES R. BOYER
by Ralph Donath & Jas. R. Snyder
Attorneys

UNITED STATES PATENT OFFICE.

CHARLES R. BOYER, OF McKEESPORT, PENNSYLVANIA.

VEHICLE-WHEEL.

1,362,922.  Specification of Letters Patent.  Patented Dec. 21, 1920.

Application filed April 30, 1918. Serial No. 231,726.

*To all whom it may concern:*

Be it known that I, CHARLES R. BOYER, a citizen of the United States, residing at McKeesport, in the county of Allegheny and State of Pennsylvania, have invented certain new and useful Improvements in Vehicle-Wheels, of which the following is a specification.

This invention relates to improvements in vehicle wheels and particularly to wheels of wooden spoke construction.

The primary object of this invention is to provide a wheel of the type specified, having its parts so arranged and constructed as to permit the removal and the replacement of broken or damaged spokes without necessitating the removal of the tire or felly from the wheel or even the wheel from the vehicle.

Other objects of this invention are to provide a wheel of the class described which is simple in its construction and arrangement, strong, durable and efficient in its use and inexpensive to manufacture.

In the drawing forming a portion of this specification and wherein like numerals of reference designate corresponding parts throughout the several views:

Figure 1 is a side view of my improved wheel with a portion of the hub in cross section.

Fig. 2 is a cross sectional view of the hub.

Fig. 3 is a detail plan view of the wedge plate.

Fig. 4 is a cross sectional view on line x—x, Fig. 3.

Figs. 5, 6, 7 and 8 are detail plan and cross sectional views of slightly modified forms of the hub construction.

My improved wheel differs in construction to that shown in my co-pending application, Serial No. 205,292, filed December 4th, 1917, in that the spokes are automatically forced into position by the action of the hub nut against the wedge plate.

Referring more in detail to the drawing, my improved wheel consists of the hub 1, the spokes 2, the felly 3, the tire 4, the hub nut 5 and the wedge plate 13. The felly 3 and the tire 4, mounted thereon, are of the usual construction and are supported by the spokes 2, which have the ordinary tenon 7 and mortise 8 connection with the felly 3.

The hub 1, preferably of metal construction, is provided with the opening 9 for the reception and passage of the axle of the vehicle, and is formed integrally with the screw end portion 10. The hub 1 is further provided with the annular groove 11 opening outwardly toward the screw end 10, having an inclined wall provided with the recesses 12, opening into the annular groove 11, which for the purpose of permitting the alternate staggering of the spokes 2, when same are seated therein, are alternately of different depth.

For the purpose of securely clamping the spokes 2 in position, I provide a wedge plate 13 having a central opening 14 for the passage of the screw end portion 10. This wedge plate consists of the flange 15 and the annular wedge portion 16, the outer surface 17 of which is slightly sloped to engage the sloped ends 18 of the spokes and the sloped inner surface 19 of the annular groove 11.

The inner face 20, of the flange 15 is provided with bosses or projections 21, positioned at regularly spaced intervals, which are adapted to engage every alternate spoke in the longer of the recesses 12, the inner face 20 of the flange 15 engaging the spokes seated in the shorter recesses.

The wedge plate 13 is securely forced into position by the hub nut 5 which has a suitably threaded inner bore 22 adapted to operate on the screw end portion 10 of the hub 1.

The hub nut 5 is further provided with a central opening 23 which forms a continuation of the opening 9 in the hub 1 for the passage of the axle, and with an octagon shaped end 24 for the application of a wrench to tighten or loosen the hub nut upon the screw end portion 10 of the hub.

By the use of my improved construction the tenons 7 of the spokes 2 are in perfect alinement with their respective mortises 8 before the former are forced in the latter by the action of the wedge plate 13.

Figs. 5, 6, 7 and 8, of the drawing, illustrate a hub construction in which the spokes are not staggered, in which instance the recesses in the hub would be of equal depth and the flange of the wedge plate not provided with the bosses or projections as heretofore mentioned.

It will be obvious that the wedge plate may be of varied construction, as for instance as shown in Fig. 8, the flange 25 and the annular wedge 26 may be separate parts instead of a unit; or instead of the annular wedge, individual wedges may be used for each spoke either formed integral with the flange or separate therefrom.

From the foregoing description, taken in connection with the accompanying drawing, the advantages of the construction and the method of operation will be readily apparent to those skilled in the art to which the invention appertains, and while describing the principle of operation of the invention together with the device which is now considered to be the best embodiment thereof, it is to be understood that the device shown is merely illustrative and that various changes in the form, proportion and the minor details of construction may be resorted to without departing from the principle or sacrificing any of the advantages of the invention as defined in the appended claim.

What I claim as new and desire to secure by Letters Patent is:—

In a wheel a hub provided with a central integral extension and an annular groove in its inner face surrounding said extension, one wall of said groove being inclined and provided with radiating recesses of alternately different depth, a wedge member to be disposed over said extension and inclined to engage under the inclined wall in said groove, spokes fitting into the recesses and contacting at their inner ends with the wedge member, said wedge member having a plurality of lugs fitting into the deeper recesses of the hub for securing the spokes therein in staggered relation to the spokes in the shallower recesses, and means for securing the wedge member upon the extension of said hub and for forcing it toward the hub for exerting outward pressure upon the spokes.

In testimony whereof I affix my signature in the presence of a witness.

CHARLES R. BOYER.

Witness:
JENNIE JONES.